Dec. 30, 1969   K. V. MATTHEWS   3,486,823
TRACKING ACCURACY CONTROL FOR ANALYZERS
Filed May 16, 1967
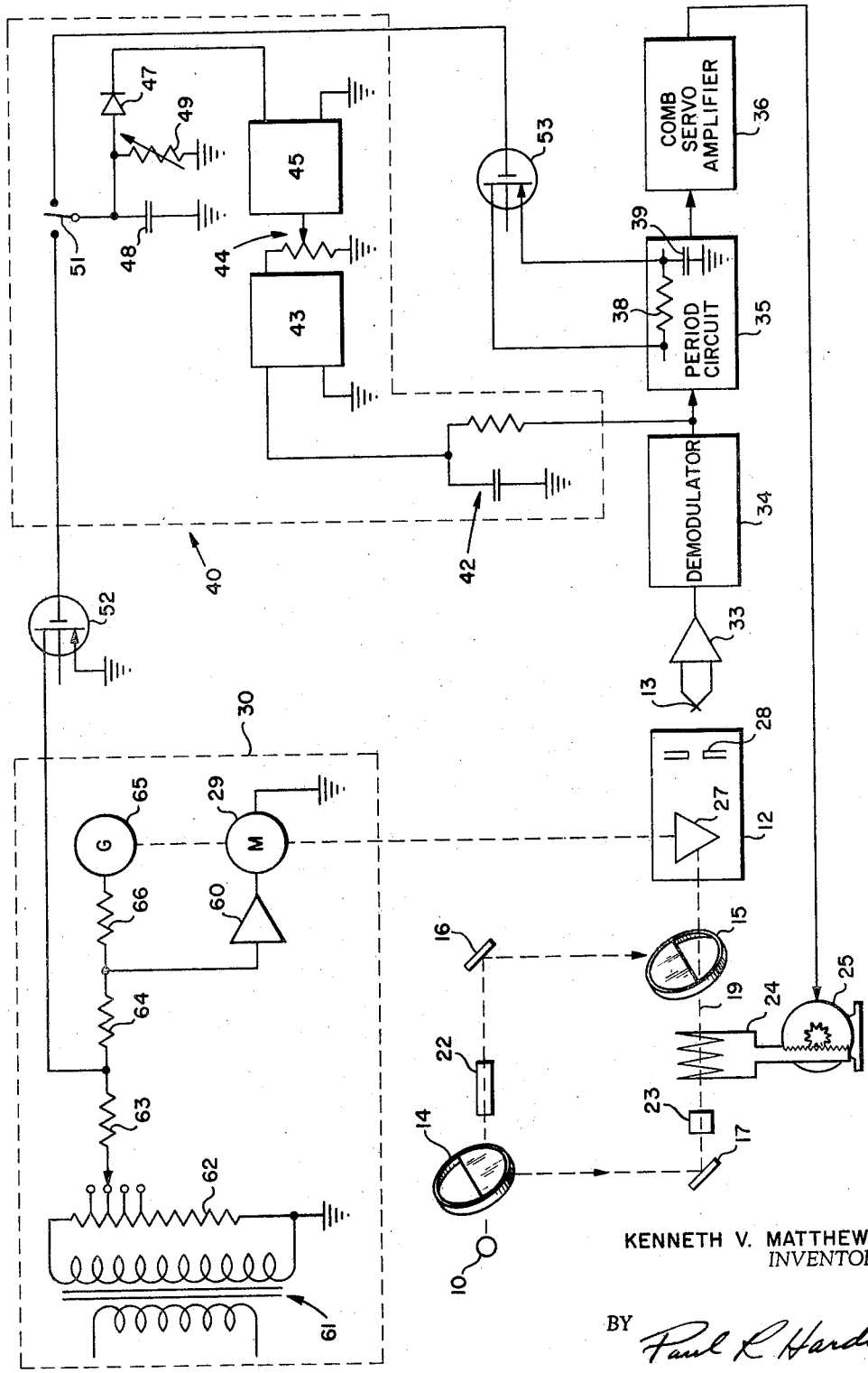
KENNETH V. MATTHEWS
INVENTOR.
BY Paul R. Harder
ATTORNEY

United States Patent Office 3,486,823
Patented Dec. 30, 1969

3,486,823
TRACKING ACCURACY CONTROL FOR ANALYZERS
Kenneth V. Matthews, Garden Grove, Calif., assignor to Beckments Instruments, Inc., a corporation of California
Filed May 16, 1967, Ser. No. 638,941
Int. Cl. G01j 3/42
U.S. Cl. 356—89                                    9 Claims

ABSTRACT OF THE DISCLOSURE

An improved period and speed suppression control for double beam optical null spectrophotometers is illustrated. The double beam system with period and scan speed control is conventional. The D.C. error signal from the null servo loop demodulator is modulated and converted to an A.C. error signal having an amplitude proportional to the amplitude of the bipolarity D.C. error signal. The A.C. error signal is passed by a half-wave rectifier to a hold-over circuit to produce a suppression control signal. The suppression control signal may be applied either to a speed suppression circuit or a period suppression circuit. The speed suppression circuit consists of an insulated gate semiconductor connected as a gain control impedance across the input of the scan motor amplifier. The period suppression circuit consists of an insulated gate semiconductor connected in parallel with the resistance element in the period circuit.

---

This invention relates to radiant energy analyzers such as spectrophotometers and more particularly relates to an improved tracking accuracy control for such analyzers.

In U.S. Patent No. 3,176,576 assigned to the assignee of the present invention, there is disclosed a tracking accuracy control for use in conjunction with double beam optical null spectrophotometers. In order to provide isolation between the auxiliary control circuit and the attenuator servo and wavelength scan circuits the prior invention utilized photodiodes in the period suppression and scan suppression circuits; these photodiodes energized by the radiant energy from a lamp located adjacent thereto. Although entirely satisfactory in operation the aforementioned system does require a power amplifier for driving the lamp and has the disadvantage of the inherent thermal delay associated with the lamp.

The present invention provides an improved speed and period suppression control which does not require the aforementioned power amplifier and does not have the thermal delay associated with the lamp while still providing the desired isolation between the period and speed suppression control circuitry and the comb servo loop and the scan drive circuitry. The present invention contemplates the utilization of insulated gate semiconductor devices in the period and speed suppression circuits which greatly simplifies the control signal generating circuitry.

The present invention will be better understood by reference to the following detailed description when read in conjunction with the accompanying drawing in which is illustrated a schematic diagram of a double beam optical null spectrophotometer with improved speed and period suppression control constructed in accordance with the teachings of this invention.

Referring now to the drawing there is illustrated a double beam spectrophotometer including a source of radiant energy 10, a beam switching system 11, a monochromator 12 and a suitable radiant energy detector 13. The beam switching system includes a pair of half-mirrors 14 and 15 rotated in synchronism by any suitable driving motor, not shown, and fixed mirrors 16 and 17, providing a sample beam path 18 and a reference beam path 19. A sample cell 22 is provided in the sample beam path for containing the sample to be analyzed. A reference cell 23 may, if desired, be positioned in the reference beam path together with any suitable beam attenuator, such as comb 24, driven into and out of the reference beam path by comb servo motor 25.

The monochromator 12 includes any suitable dispersing element, such as, prism 27, and an exit slit 28 which permits only a small fraction of the dispersed beam to impinge upon the detector 13. As the dispersing element is rotated by the wavelength drive motor 29, the entire spectrum of interest may be scanned past the exit slit 28. The scan motor is energized from a scan motor control circuit 30 which is ordinarily set to drive the scan motor at a constant speed. A programmed change in scan speed over the spectrum may be desired and is conventionally accomplished by coupling the motor to the dispersing element by means of a suitably contoured cam.

The output of detector 13 is an electrical signal proportional to the difference in intensity of the radiation traversing the sample and reference paths, the error signal cyclically varying at the beam switching rate.

The output of detector 13 is connected to an amplifier 33, a demodulator 34, a period circuit 35 and a comb servo amplifier 36. The output of amplifier 36 drives the attenuator servo motor 25, with the amplifier and motor functioning as an attenuator servo loop as is well known in the art. The output of the attenuator motor is a measure of the absorption at the sample cell and may ordinarily be utilized to drive a recorder or other suitable output device.

Demodulator 34 is operated in synchronism with the beam switching mirrors 14 and 15 and demodulates the A.C. error signal to a D.C. signal having an amplitude proportional to the difference in intensity of the reference and sample beam radiation. The D.C. error signal has a polarity indicative of the relative magnitude of the sample beam intensity with respect to the reference beam intensity. The period circuit 35 is generally a low pass filter which limits the response rate of the attenuator servo loop and reduces the sensitivity of the instrument to sharp transients in the error signal such as are ordinarily produced by noise. The time constant of the period circuit is selected as a compromise between the maximum response rate of the attenuator servo loop and an acceptable noise level. The simplest form of period circuit utilized in many instruments is a resistance-capacitance filter section comprising a series resistor 38 and a shunt capacitor 39. It should be understood that in practice resistor 38 may be made variable or one of a plurality of resistors selected to provide a variable or selectable time constant of the period circuit.

As is known in the prior art and taught in the aforementioned U.S. Patent No. 3,176,576, it is often desirable to have the wavelength scan motor driven at a high speed and to omit the period circuit (or make the time constant very short) such that a complete spectrum analysis may be accomplished in a relatively short time with a high degree of accuracy in the recorded output. The presence of noise ordinarily requires, however, the period circuit which reduces the response rate of the attenuator servo loop. When large error signals are generated, the attenuator servo lags behind the scan system and errors occur in the recorded output which are ordinarily known as tracking accuracy errors. The aforementioned patent teaches that the tracking accuracy errors may be reduced by suppressing the wavelength scan motor speed during the existence of large error signals in the attenuator servo loop or by controlling the time constant of the period circuit by reducing this time constant during conditions of these large error signals so that the response rate of the attenuator servo loop increases and permits rapid and accurate nulling by the attenuator. When it is desired by the spectroscopist to operate the analyzer at a relatively high scanning speed, the spectroscopist will ordinarily choose a relatively short time constant for the period circuit and utilize speed suppression to improve tracking accuracy. However, if the instrument is to be operated at a relatively low speed with a relatively long period or time constant, period suppression may be preferable so as to improve tracking accuracy without increasing noise in the recorded spectra.

There is illustrated in the drawing an improved scanning speed and period suppression circuit. The bipolar D.C. error signal from demodulator 34 is connected to a controlled signal generating circuit generally indicated by the reference numeral 40 through a short time constant filter network 42. The time constant of filter 42 is selected to be large enough to substantially filter any chopping frequency component in the demodulated error signal but is made short compared to the shortest time constant of period filter 35 so that speed or period suppression will occur before the attenuator servo receives the error signal, thus preventing distortion of the recorded absorption spectra which would otherwise occur.

The filtered D.C. error signals, which as has hereinbefore been pointed out may be of either positive or negative polarity, are converted to an A.C. error signal by modulator 43 at any suitable frequency, passed by suppression level control or gain control potentiometer 44 to an A.C. amplifier 45. The output of amplifier 45 is passed through a half-wave rectifier comprising diode 47 arranged to pass only the negative half of the output of amplifier 45. It will be appreciated that the foregoing components have produced a negative or unipolar control signal having an amplitude that varies as a function of the amplitude of the D.C. error signal from demodulator 34 for both positive and negative polarity outputs of the demodulator. The control signal is passed by a "hold-over" circuit comprising capacitor 48 and variable resistor 49 to a switch 51 which may be utilized to selectively connect the control signal to either the scan speed suppression circuit or the period suppression circuit. Resistor 49 of the hold-over circuit is made variable to provide an adjustment for determining how long the suppression remains after the error signal has been received. When switch 51 directs the control signal to the scanning speed suppression circuit the hold-over circuit prevents a sudden speeding up of the scan motor at the peak of a sharp absorption band where the error signal from demodulator 34 must necessarily fall to zero and reverse polarity. The effect of the hold-over circuit is the same when switch 41 connects the control signal to the period suppression circuit and also prevents a sudden return of the time constant to its original value under the same conditions.

In the scanning motor control circuit 30, the motor 29 is driven from amplifier 60. The amplifier input is provided from a suitable A.C. source through transformer 61, a tapped resistor 62 and series resistors 63 and 64. The desired motor speed is set by selecting the particular tap on resistor 62. The motor speed is stabilized by feedback from a tachometer generator 65 through resistor 66.

The scanning speed suppression circuit consists of an insulated gate semiconductor element 52 having its input and output terminals connected in shunt across the input of the servo amplifier 60. Specifically, a metal-oxide-semiconductor field effect transistor may be utilized by connecting its drain terminal to the junction of resistors 63 and 64 and its source terminal to ground. The gate or control terminal of the semiconductor is connected to switch 51. Similarly, the period suppression control circuit may comprise an insulated gate semiconductor 53 having its input and output terminals connected across resistor 38 in period circuit 35 and its control terminal connected to the other terminal of switch 51. In both circuits the substrate terminal is allowed to float.

As used herein an "insulated gate semiconductor" is intended to mean a semiconductor device in which the impedance between its input and output terminals is controlled by a voltage imposed at the control terminal and which draws no significant current at the control terminal. Since only a potential is needed at the control terminal the need for isolating transformers in the suppression control signal generating circuit is alleviated. Further, since no current is drawn at the control terminal no charge from capacitor 48 is removed by the suppression element and the holdover time is determined solely by adjustable resistor 49. Although other types of semiconductors may be utilized, these devices require power in the form of a current at the control terminal. If these devices are utilized an isolating transformer must be inserted within the control signal generating circuit 40. Further, with these types of devices, the control terminal current drains charge from capacitor 16 until they start to turn off at which time the current drained thereby becomes smaller, and the control of the holdover resistor more dominant resulting in a variable holdover time which cannot be accurately controlled by the hold-over resistor. The metal-oxide-semiconductor field effect transistors are examples of suitable insulated gate semiconductors. Although P-channel type devices have been illustrated, N-channel devices may also be utilized with appropriate change in bias and control signal polarities.

In operation upon occurrence of a D.C. error signal at the output of demodulator 34, a negative control signal is generated which has an amplitude that varies as a function of the amplitude of the demodulated error signal for both polarities of such signal, the control signal charging capacitor 48 negatively with respect to ground. This negative control signal is applied to the control terminal of either of insulated gate semiconductors 52 or 53 depending upon the condition of switch 51 and operates to reduce the impedance between the input and output terminals of these devices. In the speed suppression mode, the reduced impedance to ground of semiconductor 52 reduces the amplitude of the A.C. signal to motor 59 thereby reducing the speed of scan motor 29 during the duration of the error signal and the hold-over period. Since the impedance of semiconductor 52 is inversely proportional to the control signal the amount of scan speed reduction is proportional to the magnitude of the error signal from demodulator 34. Likewise, the time constant of period control circuit 35 is reduced by the shunting effect of period suppression semiconductor 53 across resistor 38, the magnitude of this reduction being determined by the amplitude of the control signal and the duration thereof by resistor 49.

There has been illustrated and described an improved speed and period suppression control for double beam spectrophotometers of the optical null type. Although the invention has been described in connection with the exemplary embodiment it should be understood that other applications of the invention are possible and that various modifications and variations of the invention will be apparent to those skilled in the art. For example, the use of a single insulated gate semiconductor appropriately switched from the speed suppression circuit to the period suppression circuit may readily be utilized.

What is claimed is:

1. In a radiant energy analyzer having a radiation source, reference and sample beam paths, a monochromator and a wavelength scanning mechanism therefor, an electrical error signal generating circuit including a radiant energy detector, a period filter circuit and a servo for varying the intensity of the beam along one of the paths, the combination of:

a drive motor in said wavelength scanning mechanism for continuously varying the wavelength output of said monochromator;

a control circut connected to said drive motor for operating said motor at a predetermined speed, said control circuit including a servo amplifier having an input, said servo amplifier energizing said motor and speed control means for setting a predetermined speed for said motor;

a resistance-capacitance section in said period filter circuit between said detector and said servo, said period filter circuit including means for setting the time constant of said filter circuit and thereby controlling the response time of said servo;

an insulated gate semiconductor element having its input and output terminals connected across the input of said servo amplifier;

an insulated gate semiconductor element having its input and output terminals connected across said resistance in said resistance-capacitance section in said period filter circuit for varying the time constant of said filter circuit;

each of said semiconductor elements having a control terminal;

control signal generating means coupled to said error signal generating circuit for generating a control signal having an amplitude that varies as a function of said error signal; and means for coupling said control signal to the control terminal of said insulated gate semiconductor elements for varying the impedance thereof.

2. The radiant energy analyzer of claim 1 wherein said insulated gate semiconductors are metal-oxide-semiconductor field effect transistors.

3. In a radiant energy analyzer having a radiation source, reference and sample beam paths, a monochromator and a wavelength scanning mechanism therefor, electrical signal generating means generating a D.C. error signal having an amplitude varying as a function of the difference in the intensity in the reference and sample beam paths and a polarity indicative of the relative magnitude thereof, attenuator servo loop means including a period filter circuit responsive to said error signal to balance the energy in said beams, the improvement comprising:

a drive motor in said wavelength scanning mechanism for continuously varying the wavelength output of said monochromator;

a control circuit connected to said drive motor for operating said motor at a predetermined speed, said control circuit including a servo amplifier having an input, said servo amplifier energizing said motor and speed control means for setting a predetermined speed for said motor;

a resistance-capacitance section in said period filter circuit and including means for setting the time constant of said filter circuit and thereby controlling the response time of said servo;

an insulated gate semiconductor element having its input and output terminals connected as a gain control element across the input of said servo amplifier;

an insulated gate semiconductor element having its input and output terminals connected across said resistance in said resistance-capacitance section in said period filter circuit for varying the time constant of said filter circuit;

control signal generating means connected to said electrical signal generating means for generating a unipolarity control signal having an amplitude that varies as a function of the amplitude of said D.C. error signal; and means for coupling said control signal to said insulated gate semiconductor elements for varying the impedance thereof.

4. The radiant energy analyzer of claim 1 wherein said insulated gate semiconductors are metal-oxide-semiconductor field effect transistors.

5. In a radiant energy analyzer having a radiation source, reference and sample beam paths, a monochromator and a wavelength scanning mechanism therefor, electrical signal generating means generating a D.C. error signal having an amplitude varying as a function of the difference in intensity in the reference and sample beam paths and a polarity indicative of the relative magnitude thereof, attenuator servo loop means including a period filter circuit responsive to said error signal to balance the energy in said beams, the improvement comprising:

a drive motor in said wavelength scanning mechanism for continuously varying the wavelength output of said monochromator;

a control circuit connected to said drive motor for operating said motor at a predetermined speed, said control circuit including a servo amplifier having an input, said servo amplifier energizing said motor and speed control means for setting a predetermined speed for said motor;

a resistance-capacitance section in said period filter circuit for setting the time constant of said filter circuit and thereby controlling the response time of said servo;

an insulated gate semiconductor element having its input and output terminals connected across the input of said servo amplifier as a gain control element;

an insulated gate semiconductor element having its input and output terminals connected across said resistance in said resistance-capacitance section of said period filter circuit for varying the time constant of said filter circuit;

control signal generating means coupled to said D.C. error signal generating means for generating a unipolarity control signal having an amplitude that varies as a function of the amplitude of said D.C. error signal, said control signal generating means including a modulator for converting said D.C. error signal to an A.C. error signal having an amplitude varying as a function of the absolute amplitude of said D.C. error signal, amplification means coupled to said modulator for amplifying said D.C. error signal, rectification means coupled to said amplification means for providing a unipolarity control signal having an amplitude that varies as a function of said D.C. error signal, hold-over circuit means connected to said rectification means and including an RC time constant for holding said control signal for a period of time determined by said RC time constant; and means for coupling said control signal to one of said insulated gate semiconductor elements for varying the impedance thereof.

6. The radiant energy analyzer of claim 5 wherein said insulated gate semiconductor elements are metal-oxide-semiconductor field effect transistors.

7. The radiant energy analyzer of claim 5 wherein said control signal generating means further includes gain control means connected between said modulator and said amplification means for setting a predetermined value of D.C. error signal required for generating said control signal.

8. In a radiant energy analyzer having a radiation source, reference and sample beam paths, a monochromator and a wavelength scanning mechanism therefor, an electrical error signal generating circuit including a radiant energy detector, and a servo for varying the intensity of the beam along one of the paths, the combination of:

a drive motor in said wavelength scanning mechanism for continuously varying the wavelength output of said monochromator;

a control circuit connected to said drive motor for operating said motor at a predetermined speed, said control circuit including a servo amplifier having an input, said servo amplifier energizing said motor and speed control means for setting a predetermined speed for said motor;

an insulated gate semiconductor element having its input and output terminals coupled across the input of said servo amplifier;

control signal generating means coupled to said error signal generating circuit for generating a control signal having an amplitude that varies as a function of said error signal; and means for coupling said control signal to the control terminal of said insulated gate semiconductor element for varying the impedance thereof.

9. In a radiant energy analyzer having a radiation source, reference and sample beam paths, a monochromator and a wavelength scanning mechanism therefor, an electrical error signal generating circuit including a radiant energy detector, a period filter circuit and a servo for varying the intensity of the beam along one of the paths, the combination of:

a resistance-capacitance section in said period filter circuit between said detector and said servo, said period filter circuit including means for setting the time constant of said filter circuit and thereby controlling the response time of said servo;

an insulated gate semiconductor element having its input and output terminals connected across said resistance in said resistance-capacitance section in said period filter circuit for varying the time constant of said filter circuit;

control signal generating means coupled to said error signal generating circuit for generating a control signal having an amplitude that varies as a function of said error signal; and means for coupling said control signal to the control terminal of said insulated gate semiconductor element for varying the impedance thereof.

References Cited

UNITED STATES PATENTS 3,176,576   4/1965   Sundstrom et al. _____ 356—89

RONALD L. WIBERT, Primary Examiner

F. L. EVANS, Assistant Examiner

U.S. Cl. X.R.

356—95, 97, 100; 250—204